United States Patent [19]
Ikezaki

[11] Patent Number: 5,223,825
[45] Date of Patent: Jun. 29, 1993

[54] COMMUNICATION CONTROL SYSTEM AND COMMUNICATION CONTROL APPARATUS

[75] Inventor: Masao Ikezaki, Neyagawa, Japan

[73] Assignee: Matsushita Electric Industrial Co., Ltd., Osaka, Japan

[21] Appl. No.: 703,054

[22] Filed: May 17, 1991

Related U.S. Application Data

[63] Continuation of Ser. No. 410,467, Sep. 19, 1989, abandoned.

[51] Int. Cl.$^5$ .............................................. H04Q 3/00
[52] U.S. Cl. .......................... 340/25.04; 340/825.52;
340/825.07; 340/825.24; 340/825.25
[58] Field of Search ....................... 340/825.04, 825.06,
340/825.24, 825.25, 825.52, 825.07; 455/68, 70,
72, 230

[56] References Cited

U.S. PATENT DOCUMENTS

| | | | |
|---|---|---|---|
| 4,689,683 | 8/1987 | Efron | 358/185 |
| 4,808,992 | 2/1989 | Beyers, Jr. et al. | 340/825.24 |
| 4,855,730 | 8/1989 | Venners et al. | 340/825.24 |
| 4,862,159 | 8/1989 | Marusa et al. | 340/825.24 |

OTHER PUBLICATIONS

"Home Bus System", Standard of Electronic Industries Association of Japan, Electronic Industries Association of Japan, Jan. 1990.
"Technical Committee No. 84: Equipment and Systems in the Field of Audio, Video and Audiovisual Engineering", International Electrotechnical Commission, Sep. 2, 1987.
"Proposed Interface Specifications for Home Bus", IEEE Transactions on Consumer Electronics, vol. CE-32, No. 3, Aug. 1986.

*Primary Examiner*—Donald J. Yusko
*Assistant Examiner*—Michael Horabik
*Attorney, Agent, or Firm*—Stevens, Davis, Miller & Mosher

[57] ABSTRACT

A communication control system or a communication control apparatus executes communication control among A/V (audio/visual) equipment or due to mutual connection with various information equipment. The communication control apparatus has a communication identification information memory section to store predetermined identification names and a processing procedure unit for inquiring and confirming that communication can be mutually executed by using the identification names. In the above construction, in the case of expanding a command by using a command for command expansion and information indicative of the kind of expansion, the transmission side transmits the identification name to the reception side by using a predetermined inquiry confirmation processing procedure and is collated with the identification name stored, thereby sending to the transmission side the information indicative of the result of the discrimination with respect to whether the mutual communication by the command expansion can be executed or not.

4 Claims, 10 Drawing Sheets

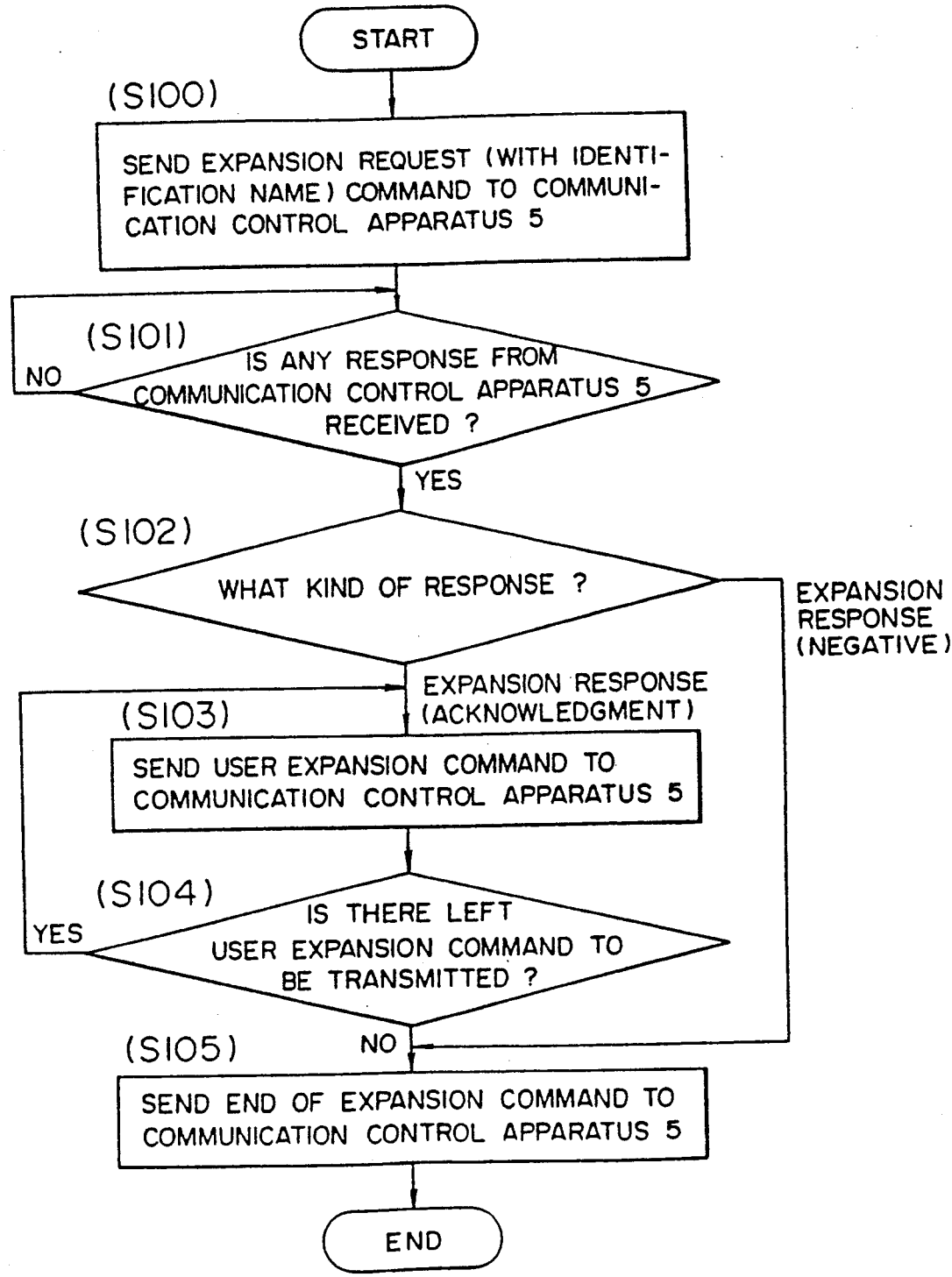

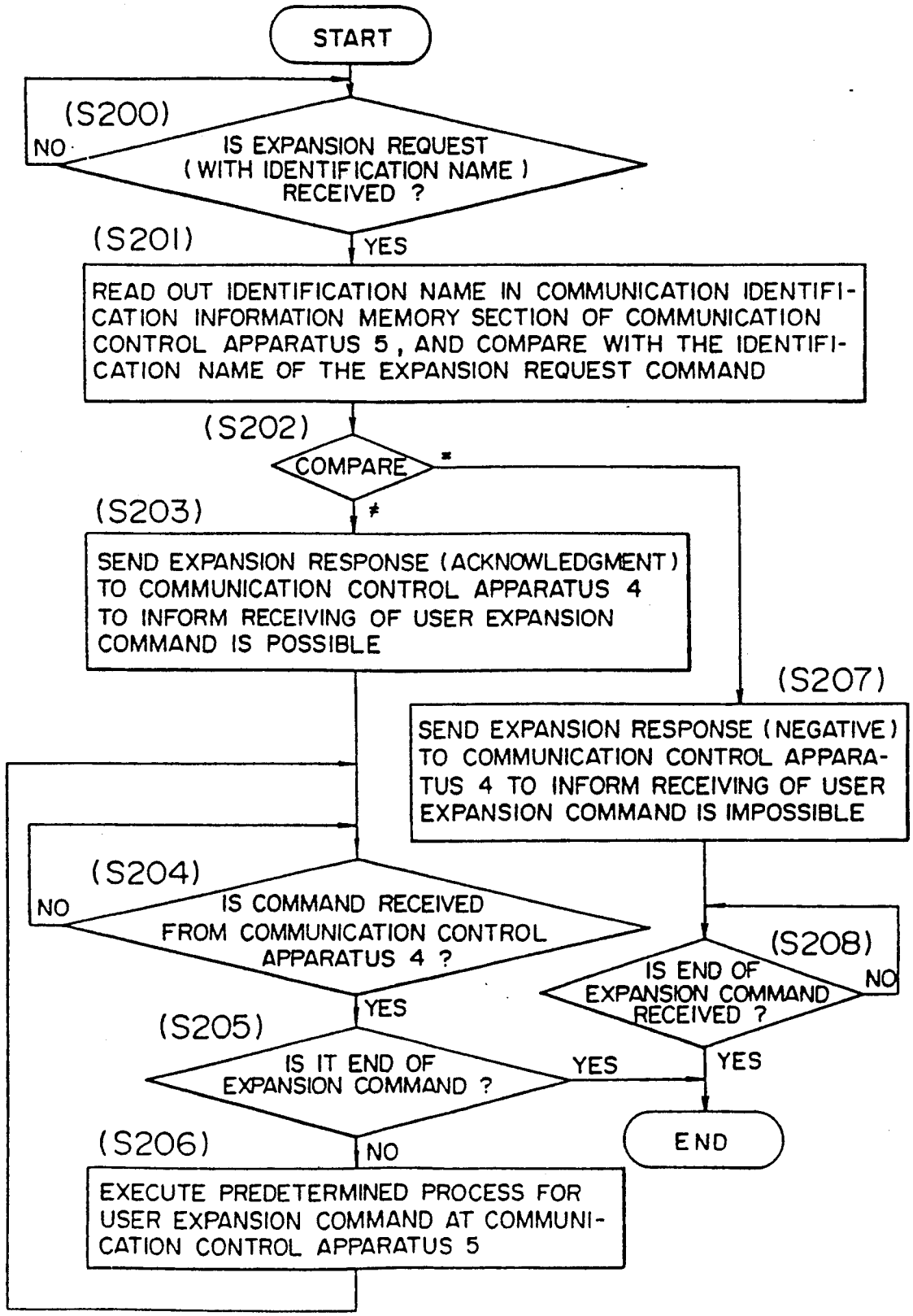

EXPANSION WHEN USING STANDARD EXPANSION COMMAND
(RECEIVING PROCEDURE AT COMMUNICATION CONTROL APPARATUS 4)

EXPANSION WHEN USING STANDARD EXPANSION COMMAND
(RECEIVING PROCEDURE AT COMMUNICATION CONTROL APPARATUS 5)

FIG. 3A

| OPC | OPR |
|---|---|
| EXPANSION REQUEST | IDENTIFICATION NAME |

FIG. 3B

| OPC | OPR |
|---|---|
| EXPANSION RESPONSE | ACKNOWLEDGMENT/ NEGATIVE |

FIG. 3C

| OPC | OPR | OPC |
|---|---|---|
| COMMAND EXPANSION | USER EXPANSION | USER EXPANSION COMMAND |

FIG. 3D

| OPC | OPR | OPC | OPR |
|---|---|---|---|
| COMMAND EXPANSION | USER EXPANSION | USER EXPANSION COMMAND | OPERAND |

FIG. 3E

| OPC | OPR |
|---|---|
| COMMAND EXPANSION | END OF EXPANSION |

FIG. 3F

| OPC | OPR | OPC | OPR |
|---|---|---|---|
| COMMAND EXPANSION | STANDARD EXPANSION | STANDARD EXPANSION COMMAND | OPERAND |

FIG. 6
PRIOR ART

| KIND | OPR (OPERAND) | | OPC (OPERATION CODE) | |
|---|---|---|---|---|
| UPPER NIBLE (HEXADECIMAL) / LOWER NIBLE (HEXADECIMAL) | UPPER NIBLE (4 BITS) | | | |
| | 0 1 2 3 4 5 6 7 | | 8 9 A B C D E F | |
| LOWER NIBLE (4 BITS) 0 1 2 3 4 5 6 7 8 9 A B C D E F | | | | |

FIG. 7A  EXPANSION WHEN USING A USER EXANSION COMMAND
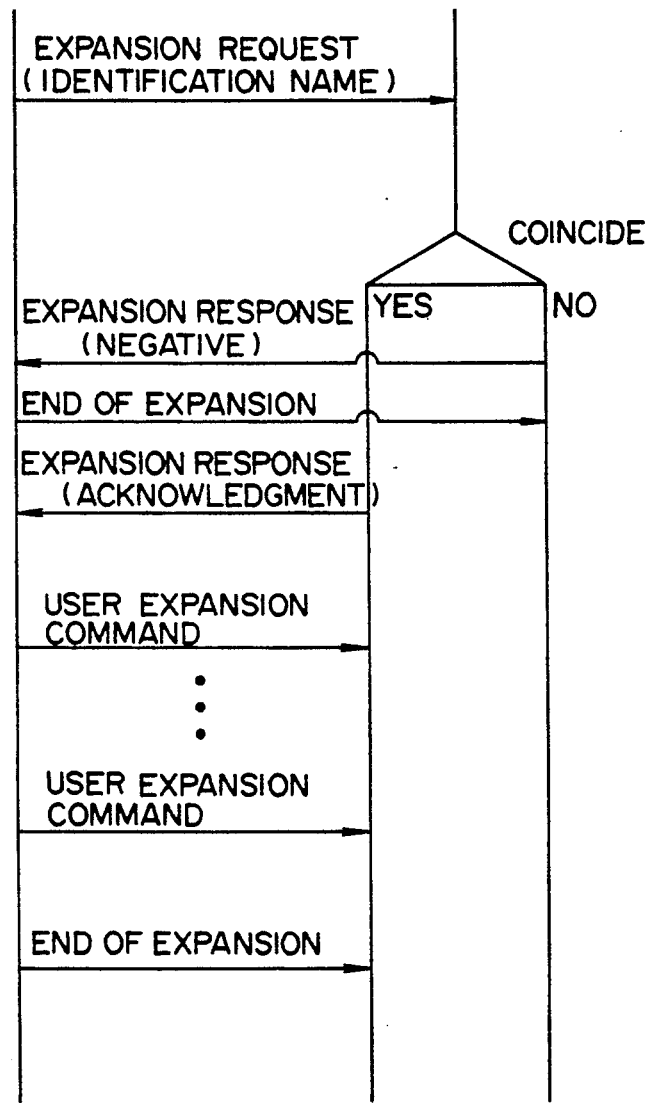
FIG. 7B  EXPANSION WHEN USING A STANDARD EXPANSION COMMAND
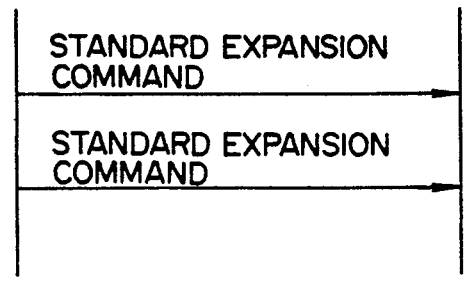

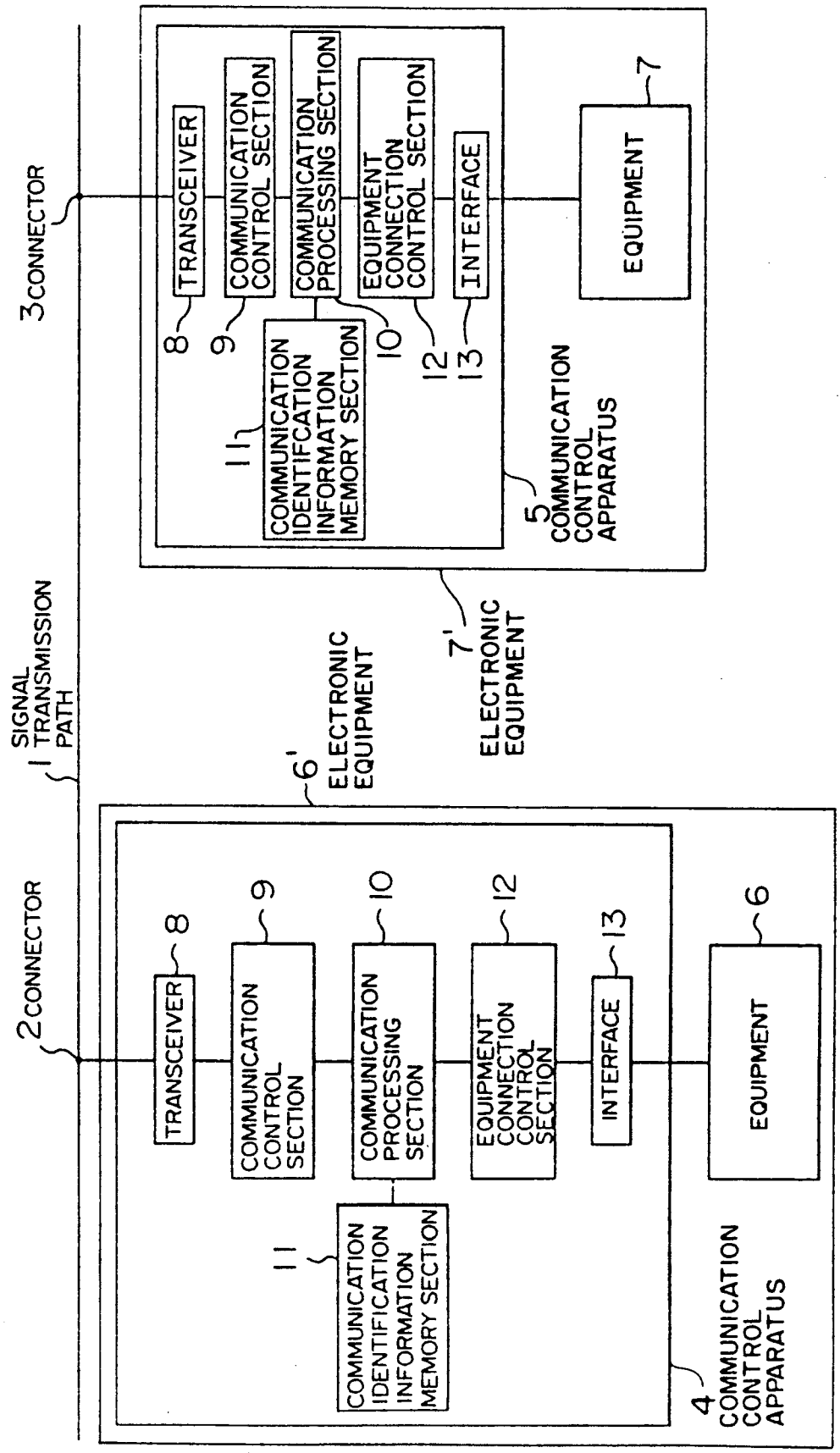

COMMUNICATION CONTROL SYSTEM AND COMMUNICATION CONTROL APPARATUS

This application is a continuation of application Ser. No. 410,467, filed Sep. 19, 1989, now abandoned.

BACKGROUND OF THE INVENTION

The present invention relates to a communication control method of an information network for use at home and to a communication control system using such a method.

Hitherto, as a communication control system for transmitting and receiving a signal by using a home-use information network, a construction shown in FIG. 5 has frequently been used.

That is, in FIG. 5, when control information is given from an equipment 6 connected to a communication control apparatus 4 to an equipment connection control section 12 through an interface 13, the content of the control information is informed from the equipment connection control section 12 to a communication processing section 10. After the communication processing section 10 formed or constructed a command which is transferred to a partner communication control apparatus 5, the command is sent to a communication control section 9 and, thereafter, it is transmitted as an electric signal from a connector 2 to a signal transmission path 1 through a transceiver 8. The electric signal is transferred from a connector 3 to the communication control apparatus 5, thereby informing the control information to an equipment 7. At this time, the communication control apparatus 5 has the same construction as the communication control apparatus 4. The transferred command is received and processed by the communication processing section 10 through the transceiver 8 and communication control section 9 in the communication control apparatus 5. Further, the command to be transferred is constructed by an operation code (OPC) and an operand (OPR) which modifies or modifies or supplements the OPC shown in FIG. 6. The command is transferred through the communication control section 9 in accordance with a predetermined communication control procedure.

In such a conventional communication control system, in the case where the command is transmitted and received between the communication control apparatuses having the same construction by using the signal transmission path 1, there is a drawback such that a command defining range which can be used in the communication processing section 10, that is, the OPC is limited to one defining region. In addition, there is also a drawback such that a method in the case of expanding the OPC is not shown.

SUMMARY OF THE INVENTION

It is an object of the present invention to provide a method in which, in the case where a command to control an equipment is transmitted or received between communication control apparatuses having the same construction which are connected to a common signal transmission path, a command defining region, that is, an OPC which can be used by a communication processing section to process, decompose, assemble, or interpret the command in each communication control apparatus, is not limited to one command defining region but the command defining region of the OPC is expanded and also to provide a communication control procedure for checking to see if the expansion command which is defined in the expansion command defining region can be executed between the communication control apparatuses or not due to such a method.

To accomplish the above object, according to the present invention, a special code in a command defining region is provided as a command for command expansion, information indicative of the kind of expansion of the command is further provided, and a communication identification information memory section to store predetermined identification names which can be read out by a communication processing section and a processing procedure to inquire and confirm that the communication can be mutually executed by using the identification name are provided in the communication processing section. Between the communication control apparatuses, by separately providing the defining regions of the expanded command, the communicating process by the command expansion is executed. With the above construction, in the case of expanding the command by using the command for command expansion and the information indicative of the kind of expansion, by using a predetermined inquiry confirmation processing procedure, the communication processing section on the transmission side transmits the identification name on the transmission side to the communication processing section on the reception side as a partner side. The communication processing section on the reception side collates the transmitted identification name with the identification name stored in the communication identification information memory section and notifies to the transmission side partner the information indicative of the result of the discrimination with respect to whether the communication by the command expansion can be mutually executed or not. Due to this, the communicating process is performed by the command expansion.

The following advantages are obtained by the present invention.

The command defining region which can be used for transmission and reception among the communication processing sections in a plurality of communication control apparatuses which are connected to a signal transmission path is not limited to one defining region but a plurality of expanded command defining regions can be used.

The mutual communicating processes by the two kinds of flexible command expansions according to the use objects comprising the expansion to the defining region of the standard expansion command and the expansion to the defining region of the user expansion command which is provided and can be defined for every user as the types of command expansion can be executed by using a simple expanding procedure.

In the case of the command expansion to the user expansion command defining region, by inquiring and confirming the identification name corresponding to the user expansion command defining region from the communication processing section in the communication control apparatus on the transmission side to the communication processing section in the communication control apparatus on the partner side, it is possible to easily discriminate whether each communication processing section can mutually use the same user expansion command defining region or not.

BRIEF DESCRIPTION OF THE DRAWINGS

FIGS. 2A-2D are flow diagrams of a communication sequence of the communication control apparatus in the comand expansion mode shown in FIG. 1;

FIGS. 3A-3F are explanatory diagrams showing formats various commands transmitted and received between the communication processing sections;

FIG. 6 is a diagram showing a command defining region of a conventional example;

FIGS. 7A and 7B are additional diagrams illustrating a communication sequence of the communication control apparatus in the command expansion mode shown in FIG. 1; and FIG. 8 illustrates items of electronic equipment containing communication control apparatus according to the invention.

DETAILED DESCRIPTION OF THE PREFERRED EMBODIMENTS

Figure 1:
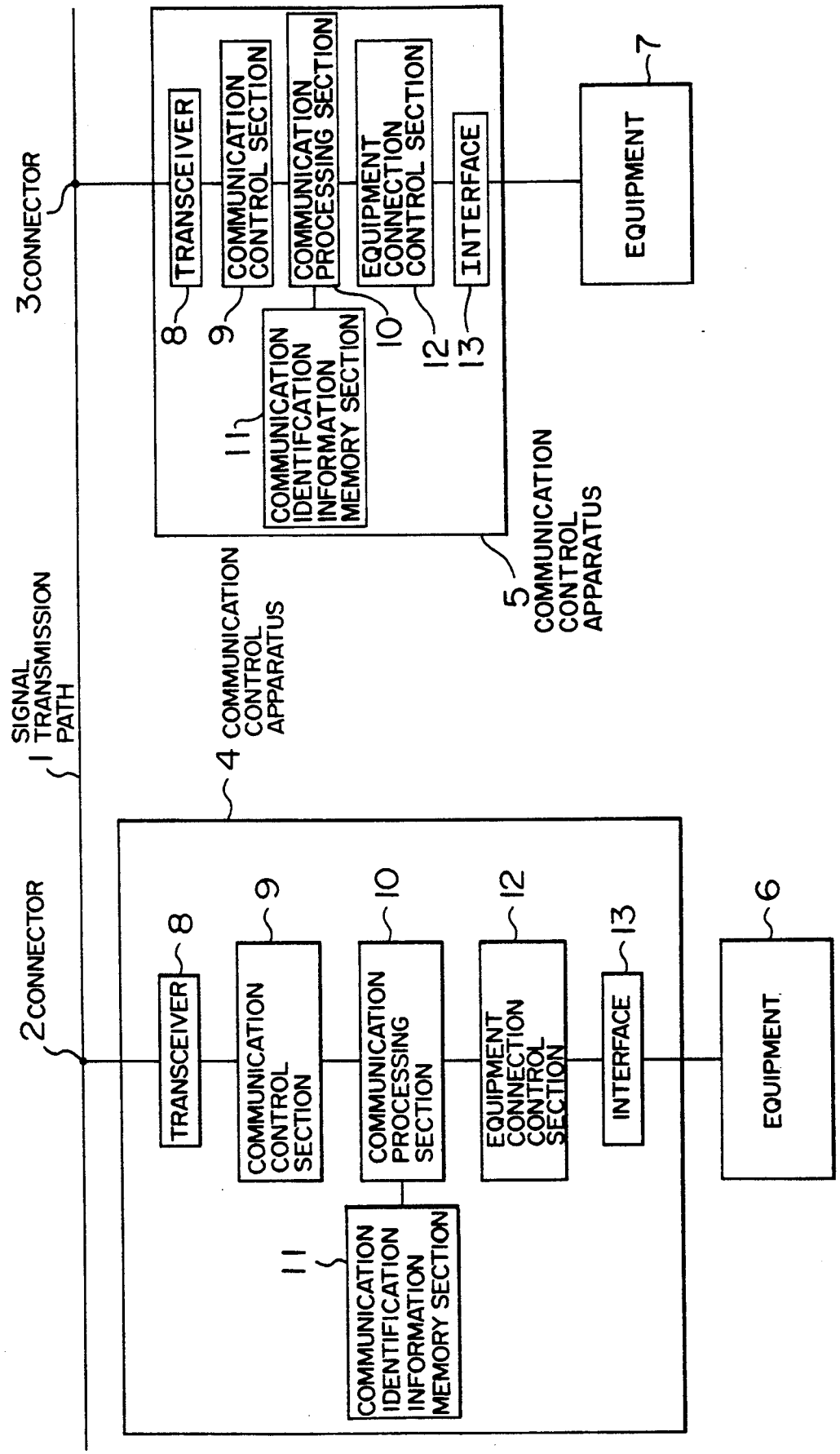
FIG. 1 is a constructional view of a communication control system according to an embodiment of the present invention.
Figure 2C:
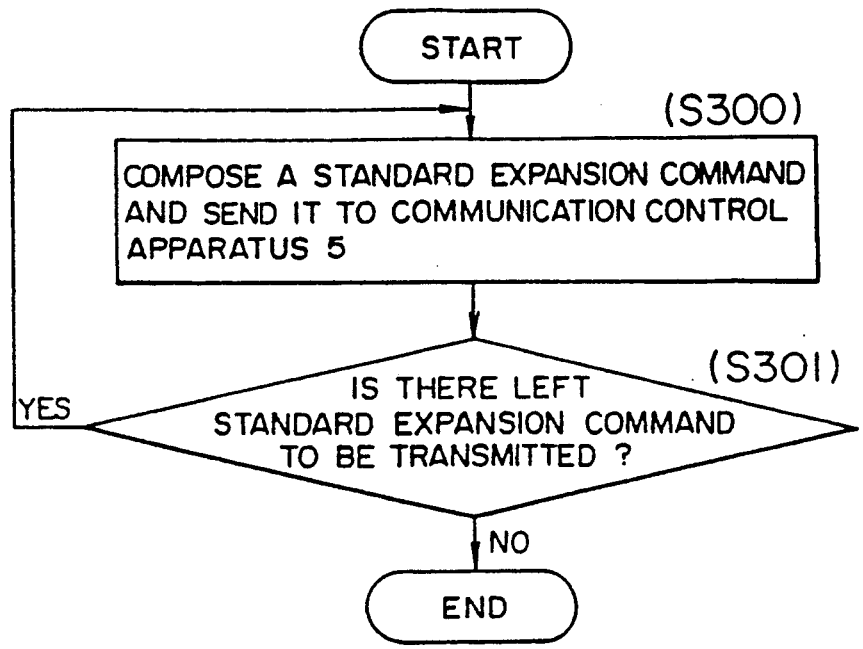
Figure 2D:
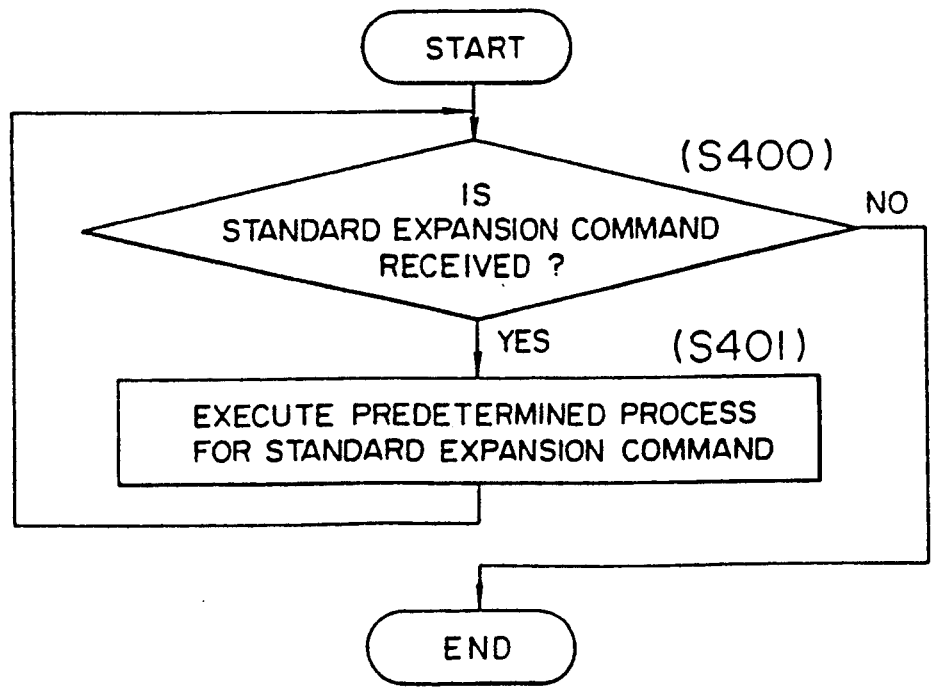

FIG. 1 is a diagram showing a construction and a communication format of communication control apparatuses in an embodiment of the invention. FIGS. 2A-2D are flow diagrams showing a communication sequence to inquire and check whether a communicating process using an expansion command is permitted or inhibited in the case where the communication control apparatuses shown in FIG. 1 execute the communicating process in a command expansion mode. FIGS. 7A and 7B illustrate this in an alternative diagrammatic format. FIGS. 3A-3F are diagrams showing combinations of commands which are used in the communication sequence in FIGS. 2A-2D FIG. 4 is a diagram showing the relation between the commands which are used in FIGS. 3A-3F and the command defining region.

Figure 5:
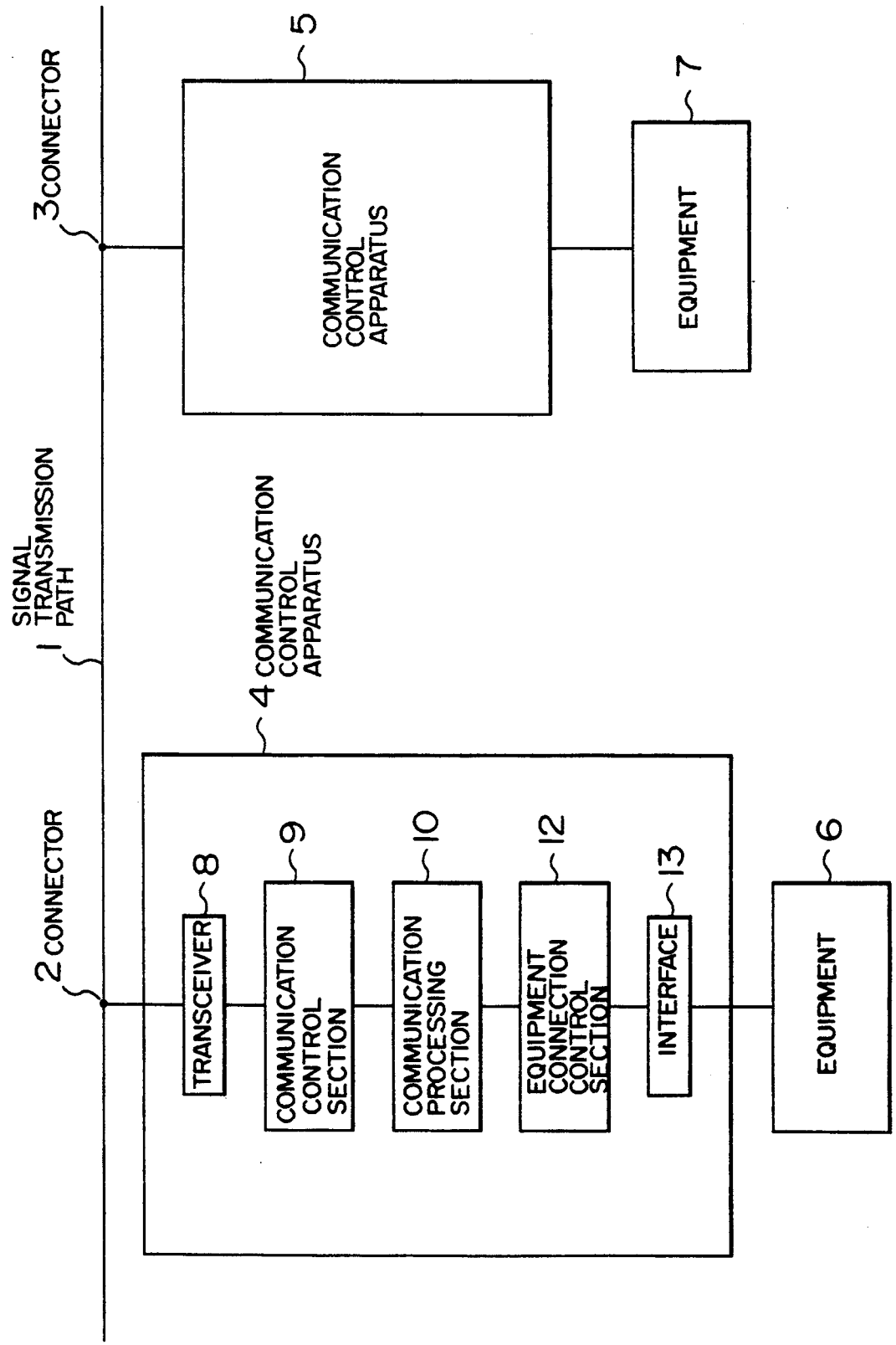
FIG. 5 is a constructional diagram of a communication control system of a conventional example.

In FIG. 1, the parts and elements which are common to those in FIG. 5 as a conventional example are designated by the same reference numerals. Reference numeral 1 denotes the signal transmission path to transmit a signal in accordance with predetermined electrical conditions; 2 and 3 indicate the connectors for fetching or transmitting the signal from or to the signal transmission path 1; 4 and 5 the communication control apparatuses which having respectively identical constructions to one another and are connected to the signal transmission path 1 through the connectors 2 and 3; 6 and 7 the equipment which are respectively connected to the communication control apparatuses 4 and 5 and execute communication and control through the signal transmission path 1 or are controlled therethrough; 8 the transceiver comprising a driver to transmit a signal to the signal transmission path 1 and a receiver to receive the signal from the signal transmission path 1; 9 the communication control section for executing a transmitting process of a signal frame to the other communication control apparatus 5 and a receiving process of a transmission signal frame which is sent to the communication control section 9 through the signal transmission path 1 via the transceiver 8 in accordance with a predetermined communication control procedure such as CSMA/CD or the like; 10 the communication processing section for interpreting the command having a predetermined defining region which is transmitted and received between the communication control apparatuses which are connected to the signal transmission path 1 and for informing a control command to the equipment 6 through the equipment connection control section 12 if necessary; 11 a communication identification information memory section which stores an identification name comprising three or more alphanumeric characters as an identification name which is assigned to every predetermined user and from which the identification name can be easily read out by the communication processing section 10; 12 the equipment connection control section for controlling in a manner such that the equipment 6 is controlled or control information is transmitted to the equipment 6 through the interface 13 in accordance with a control request including no command from the communication processing section 10 or a notification request of the control information including one or more commands or the control information is transmitted to the communication processing section 10 in the opposite direction in accordance with the control request including no command from the equipment 6 or a notification request of the control information including one or more commands; and 13 the interface for electrically connecting the equipment 6 and the communication control apparatus 4.

The processing operation according to the above construction will now be described. When the equipment connection control section 12 generates a request to start the command expansion to the communication processing section 10 from the equipment 6 shown in FIG. 1 through the interface 13 of the communication control apparatus 4, the communication processing section 10 inquires to the communication processing section 10 in the communication control apparatus 5 and checks to see if command expansion can be executed or not by using, a sequence of an inquiry checking procedure shown in FIGS. 2A-2D. That is, the communication control apparatus 4 on the transmission side confirms that communication processing section 10 of the partner communication control apparatus 5 can receive and process a user expansion command which is defined by a defining region shown in FIG. 4 which was command expanded. At this time, the communication processing section 10 in the communication control apparatus 4 on the transmission side determines that the user expansion command can be transmitted to the communication processing section 10 in the communication control apparatus 5 on the reception side, thereby setting the operating mode into the command expansion mode. Thereafter, it is assumed that the user expansion command can be transmitted.

On the other hand, the communication processing section 10 in the communication control apparatus 5 of FIG. 1 which received a command for an expansion request shown in FIG. 3A for inquiry and confirmation regards that the communication processing sections 10 in the communication control apparatuses 4 and 5 have the same user expansion command defining region if the result of the collation shown the coincidence by comparing the identification name of three or more characters in which the fact that the user expansion command which is transmitted from the communication processing section 10 in the communication control apparatus 4 on the transmission side can be received was transmitted and received as an operand of the expansion request command shown in FIG. 3A and the identification name of three or more characters which has previously been stored in the communication identification information memory section 11 in the own communication control apparatus 5 in FIG. 1 on the reception side. The communication control apparatus 5 of FIG. 1 on the reception side returns an acknowledgment response as an expansion response shown in FIG. 3B and sets the operating mode into the command expansion mode. Thereafter, it is assumed that the user expansion command can be received. If both of the identification names are different as the result of the collation a negative response is returned as an expansion response shown in FIG. 3B. The operating mode is not set into the command expansion mode. Even if the user expansion command which is transmitted from the transmission side after that is received by the communication control section 9 in the communication control apparatus 5 in FIG. 1, the communication processing section 10 in the communication control apparatus 5 does not interpret and process the user expansion command but unconditionally abandons it, thereby preventing an erroneous operation of the communication processing section 10 on the reception side.

Figure 4:
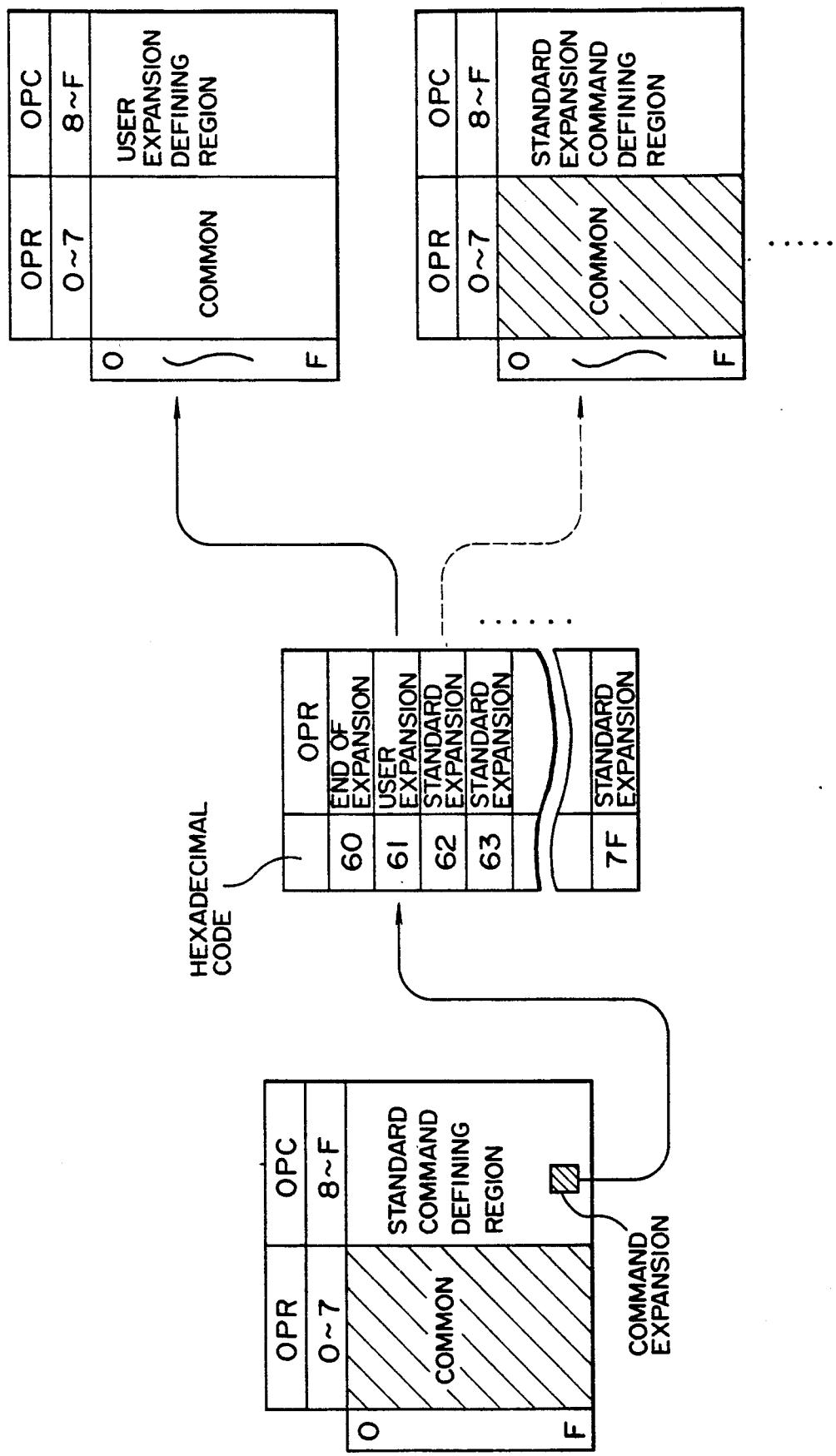
FIG. 4 is a diagram showing the relation between a command expansion defining region and an operand (OPR)

The identification name which is defined by the operand of the expansion request command in FIG. 3A is previously assigned so as to correspond to the defining region of the user expansion command shown in FIG. 4 in a one-to-one corresponding relation. That is, if a plurality of identification names exist, the defining region of one user expansion command is assigned to corresponding one of the identification names.

In the communication processing section on the reception side, if the identification names do not coincide in the collation, after the user expansion command which is subsequently transmitted from the communication processing section which had transmitted the identification name was received, the user expansion command is not interpreted and processed but can be abandoned. Therefore, the communication processing section on the reception side can efficiently prevent an erroneous operation which occurs by an erroneous interpreting process by the reception of a command in the user expansion command defining region corresponding to another identification name having the same value as the code value of an arbitrary command in the user expansion command defining region corresponding to the identification name which the reception side communication processing section has.

An inquiry checking procedure of command expansion will now be described hereinbelow.

(1) A standard command which is defined by a defining region of a standard command shown in FIG. 4 is generally used as a command which is transmitted and received between the communication processing section 10 in the communication control apparatus 4 in FIG. 1 and the communication processing section 10 in the communication control apparatus 5 of FIG. 1. Respective commands of an expansion request, an expansion response, and a command expansion to which codes are previously assigned and which are defined as the standard commands are used in each sequence in FIGS. 2A-2D on the basis of formats of FIGS. 3A-F. The starting/finishing operations in the command expansion mode using the communication sequence in the case of the expansion when the user expansion command in FIGS. 2A-2D is used will now be described hereinbelow.

(2) There are cases (a) where the defining region of the command which is used between the communication processing section 10 in the communication control apparatus 4 in FIG. 1 and the communication processing section 10 in the communication control apparatus 5 of FIG. 1 is switched from the standard command to the standard expansion command and (b) where the defining region of the command is switched from the standard command to the user expansion command which can have an individual command defining region for every user. In case (a), as shown in FIG. 4, if either one of the OPRs which were defined as standard expansion of the OPRs of 62H, 63H, ..., 74H shown in FIG. 4, for instance, 62H is designated (S300 and S301 in FIG. 2C) for an OPC of the command expansion which is previously defined in the standard command defining region, the reception side unconditionally interprets and processes (S400 and S401 in FIG. 2D) such that the OPC subsequent to the OPR of 62H is the expansion command which was defined in the standard expansion command defining region. At this time, the expansion command which is transmitted between the communication processing sections 10 has a format shown in FIG. 3F and is executed by using a communication sequence shown in FIGS. 2A-2D.

In the case (b), the processes shown in the following item (3) are executed.

(3) When the OPR shown in FIG. 4, that is, the OPR=61H which is defined as a user expansion is designated for the OPC of the command expansion which is previously defined in the standard command defining region in FIG. 4, the reception side interprets such that the OPC subsequent to the OPR of 61H is the expansion command which was defined in the user expansion command defining region. In this case, since the user expansion command defining region can be individually defined every user, by giving the identification names each comprising three or more characters which are assigned to the user expansion command defining regions in a one-to-one corresponding relation, the reception side can unconditionally interpret and process the user expansion command. The expansion command which is transmitted and received between the communication processing sections 10 has formats of FIGS. 3C and D and is executed by using a communication sequence shown FIGS. 2A-2D. That is, the communicating process is executed in accordance with a procedure in the following item (4).

(4) In the case where the communication processing section 10 in the communication control apparatus 4 transmits the user expansion command to the communication processing section 10 in the communication control apparatus 5, as shown in FIGS. 2A-2D, first, the identification name corresponding to the defining region of the user expansion command is read out of the communication identification information memory section 11 in FIG. 1 by the communication processing section and is set as OPR into the OPC of the expansion request which is previously defined as a standard command. Then the communication control apparatus 4 of FIG. 1 transmits the readout identification name (S100 in FIG. 2A) to the communication processing section 10 in the communication control apparatus 5 of FIG. 1 on the basis of a command format shown in FIG. 3A.

(5) The communication processing section 10 in the communication control apparatus 5 of FIG. 1 searches and collates (S201 in FIG. 2B) the identification name on the transmission side which was received (S200 in FIG. 2B) as an OPR of the expansion request OPC and the identification name which has previously been stored in the communication identification information memory section 11 in the communication control apparatus 5 having the same construction as communication control apparatus 4 of FIG. 1 on the reception side as an identification name corresponding to the user expansion command defining region which, can be received and processed. As the result of the collation (S202 in FIG. 2B), if the coincident identification name exists, the communication processing section 10 included in communication control apparatus 5 of FIG. 1 on the reception side adds the OPR of the acknowledgment to the expansion response OPC in FIG. 3B and returns to the transmission side (S203 in FIG. 2B). After the communication processing section 10 in the reception side communication control apparatus 5 of FIG. 1 returned the expansion response command having the OPR of the acknowledgment, the information to discriminate that the operating mode has been set into the command expansion mode is set into the communication processing section 10 included in communication control apparatus 5 of FIG. 1. After that, the communication processing section 10 in the communication control apparatus 5 of FIG. 1 receive and process the user expansion command, having the formats shown in FIG. 3C and/or FIG. 3B and executes the processes in the following items (6). As the result of the search and collation, if no coincident identification name exists, the communication processing section 10 included in communication control apparatus 5 of FIG. 1 on the reception side adds the negative OPR to the expansion response OPC in FIG. 3B and returns to the transmission side (S207 in FIG. 2B). After the communication processing section 10 in the communication control apparatus 5 of FIG. 1 on the reception side returned the expansion response command having the negative OPR, it executes the processes in the following item (9).

(6) The OPR string indicating the identification name are added to the expansion request OPC and they are transmitted from the communication processing section 10 in the communication control apparatus 4 of FIG. 1 to the communication processing section 10 in the communication control apparatus 5 of FIG. 1. After that, the communication processing section 10 in the communication control apparatus 4 receives (S101 in FIG. 2A) either one of the next expansion response commands as the response which is returned from the communication processing section 10 in the communication control apparatus 5. That is, there is a case of the command reception in which the OPC indicates the expansion response and the OPR indicates the acknowledgment (S102 in FIG. 2A) and a case of the command reception in which the OPC indicates the expansion response and the OPR indicates the negation (S102 in FIG. 2A). In the former case, the information indicating that the operating mode has been set into the command expansion mode is set into the communication processing section 10 in the communication control apparatus 4. After that, the communication processing section 10 in the communication control apparatus 4 can transmit and process (S103 in FIG. 2) (S203 and S206 in FIG. 2B) the user expansion command having the formats shown in (FIG. 3C and/or FIG. 3D) and executes the processes in the following item (7).

On the other hand, in the latter case, the communication processing section 10 in the communication control apparatus 4 regards that the inquiry and checking procedure of the expansion using the expansion request command could not be accepted by the partner side. Therefore, the communication processing section 10 interrupts the processing procedure of the subsequent expansion request and executes the processes in the following item (8).

(7) The communication processing section 10 in the communication control apparatus 4 of FIG. 1 and the communication processing section 10 in the communication control apparatus 5 of FIG. 1 an mutually execute the transmission and reception by using the user expansion command corresponding to the identification name which has previously been used for inquiry. At this time, the command having the formats shown in FIG. 3C and/or FIG. 3D is used. However, although the communication processing section 10 on the reception side correctly executes the receiving process (S204 in FIG. 2B) if the internal identification information indicative of the command expansion mode has been set, if it has been reset, the communication processing section 10 included in communication control apparatus 5 of FIG. 1 on the reception side does not process the received user expansion command but abandons it. After that, if the user expansion command to be transmitted by the communication processing section 10 in the communication control apparatus 4 is extinguished (S104 in FIG. 2A) or after the transmission of the user expansion command was interrupted by the command expansion mode end request, due to the control information from the equipment 6 in FIG. 1, processes in the following item (8) are executed.

(8) The communication processing, section 10 in the communication control apparatus 4 of FIG. 1 on the transmission side transmits (S105 in FIG. 2A) the command of the format shown in FIG. 3E, that is, the command in which the OPC indicates the command expansion and the OPR indicates the end of expansion to the communication processing section 10 in the communication control apparatus 5 of FIG. 1 on the partner side. At this time, after completion of the transmission, the communication processing section 10 in the communication control apparatus 4 of FIG. 1 resets the information indicative of the command expansion mode which is held as a set in the communication processing section 10 included in communication control apparatus 4 of FIG. 1.

On the other hand, when the communication processing section 10 included in the communication control apparatus 5 of FIG. 1 receives (S205 in FIG. 2B) the command which is indicated by the command expansion OPC and the expansion end OPR, the communication processing section 10 included in communication control apparatus 5 of FIG. 1 which received such a command resets the information indicative of the command expansion mode which is held as a set in the communication processing section 10 included in communication control apparatus 5 of FIG. 1.

After the identification information indicative of the command expansion mode was reset by each of the communication processing sections 10 on the transmission side and reception side, the communication processing section 10 included in communication control apparatus 5 of FIG. 1 shifts the operating mode from the mode in which the user expansion command can be received and processed to the mode in which it cannot be received and processed. That is, the operating mode is set into the ordinary mode in which only the standard command and/or the standard expansion command can be transmitted and received and processed.

(9) The communication processing section 10 in the communication control apparatus 5 of FIG. 1 once enters into a waiting state (S208 and in FIG. 2B) for receiving an end of expansion command, getting out of the waiting state when receiving the end of expansion command, and keeps the ordinary mode in which only the standard command and/or the standard expansion command can be transmitted and received.

Due to this, the OPC of the command expansion and the OPR of the kind of expansion are provided and, further, the communicating process by the user expansion command can be easily mutually executed by using the identification name of three or more characters which is stored in the communication identification information memory section provided.

I claim:

1. A communication control system having at least a first communication control apparatus and a second communication control apparatus each connected to a command signal transmission path and at least a first item of equipment and a second item of equipment respectively connected to said first communication control apparatus and said second communication control apparatus, said first communication control apparatus and said second communication control apparatus transmitting and receiving a message therebetween, wherein each of said first communication control apparatus and said second communication control apparatus comprises:

a communication control section for executing communication control relating to transmission and reception of said message under a predetermined communication control procedure, said message containing data and at least one of a command and an identification name in accordance with a predetermined physical encoded signal format, said data being set or displayed in said first or second item of equipment, said command specifying internal operations performed in said first or second item of equipment, and said identification name specifying one of a plurality of expansion command defining regions provided in a message receiving side of the first or second communication control apparatus;

a communication processing section for processing a command which has a plurality of said defining regions including a logical message format for commands and expansion commands, said defining regions containing entry command codes including expansion command codes executable by the first or second item of equipment operating in a message receiving mode, each of said defining regions having a corresponding said identification name having three or more alphanumeric characters, said entry command codes having a same command value for said defining regions but being distinguishable from each other by being combined with a different said identification name;

wherein said communication processing section extracts an entry command code from said message received through said communication control section and decides whether or not the extracted entry command code coincides with one of the entry command codes of one of said defining regions specified by the identification name;

an equipment connection control section for sending to said first or second item of equipment the extracted entry command code and related parts of said message as control information only when the extracted entry command code is found in one of said defining regions specified by said identification name, said first or second item of equipment performing a specified operation according to said control information; and a communication identification information memory section for storing said identification names from which said communication processing section reads out the stored identification names directly;

wherein the communication processing section of the first or second communication control apparatus operating in a message sending mode transmits, before the start of transmission of said message, to said communication processing section of the other of said first or second control apparatus operating in said message receiving mode, an inquiry as to whether a prescribed defining region will be usable or not for deciding whether or not extracted entry command codes are found in the prescribed defining region, using a combination of command codes specially provided for inquiry purposes and said identification name which is stored in the communication identification information memory sections in both of the message sending and receiving sides in common.

2. A system as in claim 1, wherein the first communication control apparatus and the second communication control apparatus are respectively provided in the first and second items of equipment to which said first communication control apparatus and said second communication control apparatus are respectively connected.

3. A communication control system according to claim 1, wherein in response to said inquiry transmitted from said communication processing section of the communication control apparatus operating in said message sending mode, said communication processing section of the communication control apparatus operating in said message receiving mode sends back an answer to said communication processing section of the communication control apparatus operating in said message sending mode as to whether or not said communication processing section of the communication control apparatus operating in said message receiving mode is ready to receive and execute an expansion command if it is sent, said expansion command being defined by an extended defining region and being used in combination with said identification name.

4. A system as in claim 3, wherein the first communication control apparatus and the second communication control apparatus are respectively provided in the first and second items of equipment to which said first communication control apparatus and said second communication control apparatus are respectively connected.

* * * * *